US012321345B2

(12) United States Patent
Niu et al.

(10) Patent No.: US 12,321,345 B2
(45) Date of Patent: Jun. 3, 2025

(54) SYSTEMS AND METHODS FOR AUTOMATED PATTERN MATCHING

(71) Applicant: MicroStrategy Incorporated, Tysons Corner, VA (US)

(72) Inventors: Fang Niu, Fairfax, VA (US); Siyuan Fan, Falls Church, VA (US); Jiande Yu, McLean, VA (US); Jason Vargas, Silver Spring, MD (US); Jose Manuel Nocedal De La Garza, Leesburg, VA (US); Nida Imtiaz, Fairfax, VA (US)

(73) Assignee: MicroStrategy Incorporated, Tysons Corner (VA)

( * ) Notice: Subject to any disclaimer, the term of this patent is extended or adjusted under 35 U.S.C. 154(b) by 0 days.

(21) Appl. No.: 17/180,171

(22) Filed: Feb. 19, 2021

(65) Prior Publication Data

US 2021/0263916 A1    Aug. 26, 2021

Related U.S. Application Data

(60) Provisional application No. 62/979,042, filed on Feb. 20, 2020.

(51) Int. Cl.
*G06F 16/245*    (2019.01)
*H04L 67/01*    (2022.01)
*H04L 67/02*    (2022.01)
*H04L 67/025*    (2022.01)

(52) U.S. Cl.
CPC ............ *G06F 16/245* (2019.01); *H04L 67/01* (2022.05); *H04L 67/02* (2013.01)

(58) Field of Classification Search
None
See application file for complete search history.

(56) References Cited

U.S. PATENT DOCUMENTS

| 10,848,482 | B1* | 11/2020 | Eisen | H04L 63/0853 |
| 11,501,016 | B1* | 11/2022 | Peterson | G06F 21/6245 |
| 2005/0262555 | A1* | 11/2005 | Waterland | G06F 21/36 |
| | | | | 713/182 |

(Continued)

OTHER PUBLICATIONS

Nick Nikiforakis; Cookieless Monster: Exploring the Ecosystem of Web-Based Device Fingerprinting;2013;IEEE; pp. 1-15.*

*Primary Examiner* — Ann J Lo
*Assistant Examiner* — Jermaine A Mincey
(74) *Attorney, Agent, or Firm* — Bookoff McAndrews, PLLC

(57) ABSTRACT

Methods, systems, and apparatus, including computer programs stored on computer-readable media, generate contextually relevant electronic information cards. At least one server may determine a pattern template defining a sequence of alphanumeric characters. The pattern template may be provided to a client device. An identifier may be received from the client device, the identifier being an instance of the pattern template, along with a request for additional information associated with the identifier. The additional information may be determined based on the identifier. The additional information associated with the identifier may be provided to the client, the additional information being incorporated into an information card associated with the identifier, at the client device.

20 Claims, 9 Drawing Sheets

(56) References Cited

U.S. PATENT DOCUMENTS

| | | | |
|---|---|---|---|
| 2006/0106599 A1* | 5/2006 | Horvitz | G06Q 10/06 |
| | | | 704/219 |
| 2012/0265779 A1* | 10/2012 | Hsu | G06F 16/3322 |
| | | | 707/E17.074 |
| 2018/0060302 A1* | 3/2018 | Liang | G06F 16/35 |
| 2018/0332016 A1* | 11/2018 | Pandey | H04L 63/0428 |
| 2019/0361929 A1* | 11/2019 | Rogynskyy | G06F 16/24578 |
| 2020/0159919 A1* | 5/2020 | Sims | G06F 21/554 |

* cited by examiner

SYSTEMS AND METHODS FOR AUTOMATED PATTERN MATCHING

RELATED APPLICATION(S)

This application claims priority to U.S. Provisional Application No. 62/979,042 filed Feb. 20, 2020, the entire disclosure of which is hereby incorporated herein by reference in its entirety.

TECHNICAL FIELD

The present disclosure relates to systems and methods for automated pattern matching to provide contextually relevant data.

INTRODUCTION

Software applications and websites are capable of accelerating contextually relevant information acquisition as compared with prior paper-based catalogues. However, problems arise in processing copious amounts of data and in presenting contextually relevant information expediently.

The present disclosure is directed to addressing one or more of these challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one general aspect, a method may generate contextually relevant electronic information cards. At least one server may determine a pattern template defining a sequence of alphanumeric characters. The pattern template may be provided to a client device. An identifier may be received from the client device, the identifier being an instance of the pattern template, along with a request for additional information associated with the identifier. The additional information may be determined based on the identifier. The additional information associated with the identifier may be provided to the client, the additional information being incorporated into an information card associated with the identifier, at the client device.

In one general aspect, a system may generate contextually relevant electronic information cards. One or more processors and one or more machine-readable media may store software including instructions that, when executed by the one or more processors, cause the system to perform operations that may determine a pattern template defining a sequence of alphanumeric characters. The pattern template may be provided to a client device. An identifier may be received from the client device, the identifier being an instance of the pattern template, along with a request for additional information associated with the identifier. The additional information may be determined based on the identifier. The additional information associated with the identifier may be provided to the client, the additional information being incorporated into an information card associated with the identifier, at the client device.

In one general aspect, a non-transitory machine-readable media may generate contextually relevant electronic information cards. At least one server may determine a pattern template defining a sequence of alphanumeric characters. The pattern template may be provided to a client device. An identifier may be received from the client device, the identifier being an instance of the pattern template, along with a request for additional information associated with the identifier. The additional information may be determined based on the identifier. The additional information associated with the identifier may be provided to the client, the additional information being incorporated into an information card associated with the identifier, at the client device.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 2 depicts an example editor for designing information cards, according to techniques discussed herein.

FIG. 3 depicts an example editor performing automatic pattern recognition, according to techniques discussed herein.

FIG. 4 depicts an example editor performing manual pattern recognition, according to techniques discussed herein.

Like reference numbers and designations in the various drawings indicate like elements.

DETAILED DESCRIPTION

Figure 1:
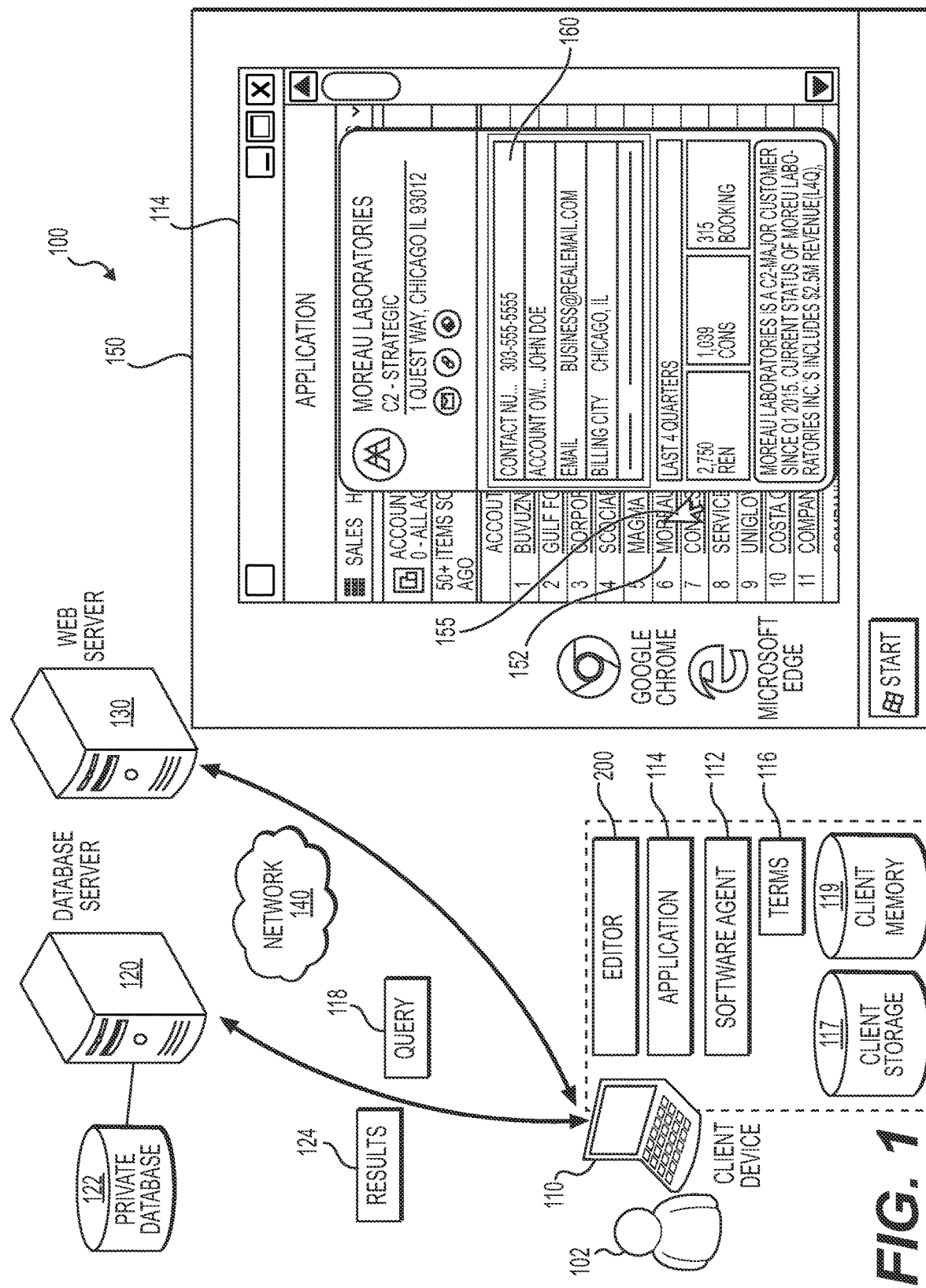
FIG. 1 is a diagram of an example of a system for inline delivery of database content.

In the discussion that follows, relative terms such as "about," "substantially," "approximately," etc. are used to indicate a possible variation of ±10% in a stated numeric value. It should be noted that the description set forth herein is merely illustrative in nature and is not intended to limit the embodiments of the subject matter, or the application and uses of such embodiments. Any implementation described herein as exemplary is not to be construed as preferred or advantageous over other implementations. Rather, as alluded to above, the term "exemplary" is used in the sense of example or "illustrative," rather than "ideal." The terms "comprise," "include," "have," "with," and any variations thereof are used synonymously to denote or describe a non-exclusive inclusion. As such, a process, method, article, or apparatus that uses such terms does not include only those steps, structure or elements but may include other steps, structures or elements not expressly listed or inherent to such process, method, article, or apparatus. Further, the terms "first," "second," and the like, herein do not denote any order, quantity, or importance, but rather are used to distinguish one element from another. Similarly, terms of relative orientation, such as "front side," "top side," "back side," "bottom side," etc. are referenced relative to the described figures. Moreover, the terms "a" and "an" herein do not denote a limitation of quantity, but rather denote the presence of at least one of the referenced item.

In some implementations, a computing system may identify keywords in a user interface, or otherwise on a display, and dynamically retrieve and present relevant information inline, or otherwise in a proximate location, with the user interface. As will be discussed further herein, keywords may be identified upon reviewing characters in a display and/or applying optical character recognition on an image capture of at least a portion of a display. For example, a client device may run a software agent, such as a mobile application, a web browser extension or desktop application, that monitors a display for instances of certain keywords.

When the keywords are present, the software agent may annotate the keywords and make them interactive in the user interface. If a user interacts with a keyword, for example, by placing a cursor over the keyword, the software agent may cause an information card or information panel to be displayed, e.g., overlaying a portion of the original user interface or otherwise inserted into the user interface. Alternatively, information cards associated with keywords, or indicators thereof, may be displayed in a designated area or subportion of a display. Information cards may be displayed in response to a user search, and may be used in conjunction with a calendar, email, or other application, where notifications to the user may be generated if keywords match contents of information cards. In this manner, the user may easily access information that is contextually relevant to the user interface, without the need to open a new application or switch between interfaces. This technique also provides numerous other advantages, such as allowing content to be efficiently integrated with third-party user interfaces that the content provider does not control.

The system may allow for significant customizability. The keywords monitored by the software agent may be specific to a user or the user's organization. For example, when the user is an employee of a company, the keywords of interest may be extracted from a private database for the company. The keywords may additionally or alternatively be selected or filtered to terms applicable to the specific user, e.g., terms relevant to the user's role in the company. When one of the keywords is determined to be present in the user interface, the software agent may communicate with a server system to obtain information related to the keyword. This information may include data retrieved from a private database that has information specific to an organization associated with the user. For example, if the keyword refers to a customer of a user's company, status information, statistics, contact information, and other information about the customer's account with the company can be provided from the company's private database.

The types of information provided, as well as the values shown for those information types, may be customized for the user and organization. For example, a sales representative and a product engineer at the same company may be shown different types of information for the same keyword, due to their different roles. Similarly, two users in a company with the same role might be shown different information for the same keyword, due to the users having different types of previous interactions with the system. In general, the system may use machine learning techniques to predictively select which information to show to a particular user at a particular time for a given keyword, and how to organize the information.

Users may also explicitly search for information cards. A recommendation engine may analyze the user's device activity history and/or search history, and evaluate information cards for similarity to produce a list of recommended information cards in response to a search.

In many conventional systems, user interfaces have a predetermined structure or layout designed to accommodate the content displayed. To add a new frame or region of the interface, the structure of each user interface to be updated usually must be changed one by one. For example, to provide embedded content in a web page or web application, the user interface is often designed to include an iFrame or other element for the embedded content. Native applications also generally have pre-defined user interface layouts. This often makes it difficult to add or alter embedded content regions in user interfaces because the source code, HTML code, or other data defining each user interface needs to be individually changed. For example, it may be desirable to provide a new embedded content region in each of many different pages of a web site or web application, but doing so may require changes to each of the pages individually.

Embedding content is also challenging because the party desiring to embed the content may not control or have the ability to change the underlying user interface. For example, a search entity desiring to embed content to a company's webpage may not have the rights or ability to either the company's webpage code and/or the code of the browser used to access the company's webpage.

The challenge of embedding content in user interfaces is also significant since the embedded content may be needed only selectively. For example, it may be desirable to embed content on some interfaces but not others. Similarly, the embedded content might only be applicable for a page at certain times and not others. The need for the embedded content may vary over time, and may depend on factors such as the context provided by other content in the page, which may also vary over time. As a result of these factors and others, simply adjusting a general template for many pages cannot perform the fine-grained integration of embedded content, since the decisions whether to embed content and what content to embed is often a page-specific decision that changes over time.

A further challenge arises since embedded content may be assembled from a plurality of data sources, including third party data sources, which may make the process slow and degrade the user experience.

The techniques discussed in this document address these challenges by allowing content to be presented inline or otherwise associated with applications that the content provider does not control and cannot modify. Similarly, the system can be configured to provide content inline or otherwise associated with other content that has not been created yet, such as web pages, web applications, and/or user interfaces of native "heavy" applications that are not yet available.

The techniques in this document also provide an efficient way for users to access information, such as analytics data, in a user interface. By allowing a user to call up an information card within an existing user interface, the user no longer needs to switch applications and lose the context of the applications involved in the user's current task.

Limited user interface space might be used since the information card may be provided in the same window or area of the application the user is already using, with no need to switch between applications. Also, the information card may be displayed and removed dynamically, so it is shown only when the user requests it. Unlike interfaces that include a dedicated, persistent area for content that may not be needed at most times, the present technique frees up more of the interface for use by an application.

The techniques discussed below also provide an efficient way to publish customized or private database content to users. The keywords or terms of interest to each organization can be set based on the private database contents for the organization. For example, each organization can have its own set of customers, employees, suppliers, product names, and so on reflected in its private database. Based on the database contents, terms/keywords may have a semantic meaning that is specific to that organization, which the system uses to tailor the display of information for members of the organization.

In some implementations, the system provides an interface for an administrator to easily adjust the sets of terms that the system will highlight and make interactive for members of the organization by updating the database or identifying certain portions of a dataset. For example, an administrator may identify columns of a private database corresponding to employee names, customer names, and product names. The system may extract the contents of these columns and designate them as key terms for the organization. The current set of these terms can be downloaded to client devices of members of the organization when they authenticate to the software agents on the client devices, so each time the user authenticates, the set of terms is refreshed at the client device based on the current state of the database. The terms may be organized into related categories. Each category may be known as an information card set. For example, terms corresponding to company names may be categorized under a company information card set. Terms corresponding to employee names may be categorized under an employee information card set. The information displayed in the information cards may also be generated using the current records of the database. Thus, by designating certain records or fields from an organization's database, an administrator can adjust or update the set of content published to some or all members of the organization, which will be made available through many user interfaces (e.g., presented in-line or adjacent to any web page or desktop application interface).

When a client device indicates that one of the key terms for the organization is present, the server system can access the underlying database record(s) corresponding to the term to generate relevant information to provide. The semantic meaning of the term that is applicable for the user and organization may be used to provide customized results. For example, different types of information may be provided based on the classification of the term, e.g., whether a term is the name of an employee, customer, or product. Different semantic classifications can have different data types or sets of information to be provided. Even for a particular classification, of the many potential types of data that may be provided, a subset may be selected based on analysis of the database contents (e.g., to identify trends or items that are popular, recent, or unusual according to various thresholds), relevance to the user (e.g., applicability to the user's historical behavior or role in the organization), and/or context (e.g., other keywords in the user interface, which may indicate geographical location, time, individuals, or other information relevant to the user's current task). In this process, the organization's security policies are preserved. If a user does not have authorization to access a field or record from the database, the server system may enforce access restrictions and might not provide the information. Consequently, different users, even within the same organization, may be presented different sets of information for the same term, due to the users' differing roles, interaction histories, access authorizations, and other factors. The data to be presented may also be customized based on the application in which the term is detected on an application-by-application basis.

However, additional challenges may arise with the presentation of contextually relevant content. Terms may be downloaded to a client, and user interfaces may be searched against the terms list. The list of terms may grow to be unwieldly, causing a slowdown at the client, memory issues, insufficient memory to hold all of the terms and/or regular expressions to search, etc. As will be discussed below, if the user interface contains well-formed item identifiers, i.e., identifiers that follow a consistent syntax or pattern, then key terms may be defined by pattern, rather than a list of every possible match. This may speed up searching, allow support for millions of items in the user interface, and may save memory on client devices.

FIG. 1 is a diagram of an example of a system 100 for inline or otherwise proximate delivery of contextually relevant content. The system 100 may include one or more client devices 110, one or more servers 120, and/or one or more web servers 130. The client device 110, server 120, and web server 130 may communicate with each other across one or more networks 140. The server 120 may have access to one or more private databases 122 for an organization. The server 120 may be implemented using multiple computers that cooperate to perform the functions discussed below, and which may be located remotely from each other.

The client device 110 may include an application 114 as well as a software agent 112 that enables the client device 110 to dynamically generate and display contextually-relevant information cards 160 inline with, or adjacent to, the application 114 on an electronic display 150 of the client device 110. As discussed below, the software agent 112 may allow the client device 110 to obtain and provide information from the private database 122 with the application 114 and web page from the web server 130, even though the application 114, which may access a web page, may be created and/or controlled by third parties.

The client device 110 may be associated with a user 102, who may be a member of an organization, e.g., an employee of a company. The private database 122 represents database records stored by or for the organization. The records might not be publicly available and may be subject to data access restrictions, such as requirements that users be issued credentials from the organization that grant authorization to access the records. Different users may be granted different levels of authorization, and the server 120 may enforce access restrictions so that each user is only allowed to access the subsets of information the user is authorized to access. Techniques used herein may also accumulate data from publicly available databases for displaying information cards 160.

In the system 100, instead of incorporating additional content into the source of a document or application, information may be instead added, just in time, through the software agent 112, for example, a browser extension for a web browser, a subroutine of application 114, etc. This provides the flexibility for the system to selectively provide dynamically changing content from the private database 122 for any interface shown on the application 114, e.g., any web application or web page displayed by a web browser, any user interface displayed on the electronic display 150 of the client device 110, etc.

In the example of FIG. 1, the client device 110 may communicate with the web server 130 to obtain and display a page of a web site or other user interface of the application 114. Web server 130 may make available an Application Programming Interface (API) through which information may be provided. Alternatively, application 114 may comprise a native desktop application, and may require no communication or minimal communication with web server 130. The client device 110 generates an electronic display 150 for the application 114. The client device 110 may generate displays in the electronic display 150 for more than one application. Concurrently, the software agent 112 may run on the client device 110 and may receive, from the application 114, the text content of the rendered page, e.g., electronic display 150. The text content may be obtained directly by data stream or analysis of source code of the user interface, or less directly by performing optical character recognition (OCR) of the electronic display 150, or a portion thereof, such as within a predetermined distance of cursor 155. The electronic display 150 may comprise a desktop displaying one or more applications, including application 114.

The software agent 112 may require the user 102 to authenticate and thus prove authorization to receive content from the private database 122. The authentication of the user 102 can also indicate to the software agent 112 and/or server 120 the role of the user in the organization (e.g., software engineer, marketing technician, financial analyst, and so on) and the specific level of access authorization that has been, or will be, granted to the user 102 by the organization.

With the user logged in, the software agent 112 may access a set of terms 116, e.g., key words and/or phrases that are relevant to the user 102 and the organization. The set of terms 116 may be stored at the client device 110. Terms 116 may be stored in client storage 117, which may comprise non-volatile storage, and/or client memory 119, which may comprise volatile storage, where the client memory 119 may provide faster data access speeds than the client storage 117. The set of terms 116 can represent values from certain fields of the private database 122, for example, values representing names of customers of the company of the user 102.

The software agent 112 may compare the terms 116 with at least a portion of the text of the electronic display 150 and/or application 114 to identify matching terms. When the software agent 112 identifies one or more matches, it may generate a query 118 that indicates the matches and send the query 118 to the server 120.

The server 120 may process the query 118 and generate results 124 using the contents of the private database 122. These results 124 may indicate, for each identified matching term, various indicators (e.g., attributes, statistics, visualizations, text, or other content) relevant to the term. In some instances, the indicators may represent key performance indicators for an entity referred to by an identified term with respect to the specific organization of the user 102. For example, when the term refers to a customer of a company of the user 102, one of the indicators may specify a product of the company that was purchased by the customer, current or forecasted sales of the company to the customer, etc.

The client device 110 may receive the results 124 from the server 120, from client storage 117, and/or client memory 119. The software agent 112 may annotate instances of the identified matching terms in the user interface and prepare the results 124 for display. For example, to annotate the matching terms, the software agent 112 may instruct the application 114 to highlight the term or otherwise change the formatting of the term (e.g., color, font, size, bold, italics, underlining, etc.) in the electronic display 150. In some implementations, the results 124 are not immediately displayed. Rather, the software agent 112 may cause the matching terms to become interactive, so that interaction of the user with a term triggers display of an information card 160 for that term. In this manner, when a user indicates interest in one of the terms, e.g., by placing a mouse cursor 155 over the term, the software agent 112 may be notified of the interaction and cause an information card with the indicators relevant to the term to be displayed. The information card 160 may be displayed overlaying, or adjacent to, a portion of the original user interface, for example, as a pop-up card near the instance of the term that the user interacted with. The software agent 112 may also detect when the user 102 is no longer interested in the information card and automatically remove (e.g., close or hide) the information card in response. For example, when the user moves the cursor 155 away from the interactive term and away from the information card (or taps or clicks outside the interactive term and information card), the software agent 112 may hide or remove the information card.

In FIG. 1, the software agent 112 has determined that the electronic display 150 includes a term 152 "Moreau Laboratories," which is one of the terms 116 relevant to the organization of the user 102. The software agent 112 has received results 124 that indicate indicators for this term 152, which may represent a customer of the organization of the user 102. In response to identifying the matching term 152, and in some instances also receiving results 124 from the server 120 for the matching term 152, the software agent 112 may make the term 152 interactive and causes the term 152 to be annotated. The annotation may comprise, as in this case, underlining, or may be bolding, italicizing, etc. Initially, the software agent 112 might not cause any of the indicators for the term 152 to be displayed. However, when the user moves the cursor 155 over, or otherwise selects, the term 152, the software agent 112 may detect the interaction and display an information card 160 showing various indicators provided by the server 120 in the results 124. When the user 102 is done reviewing the information card 160, the user 102 may move the cursor 155 away or click away from the term 152 and information card 160, and the software agent 112 may automatically hide or remove the information card 160 until the user 102 again interacts with the term 152.

The software agent 112 may receive and examine the content of the electronic display 150 on a recurring or ongoing basis. For example, as the user 102 navigates to a new web page or a new view of an application, the software agent 112 may examine the updated content of the electronic display 150. The software agent 112 may determine matches in the updated interface, request/obtain new results for the updated interface, and may cause new sets of terms to be annotated and made interactive, allowing the user 102 to access information cards for key terms for whatever interface content may be provided in the application 114. The software agent 112 may receive and analyze user interface content in substantially real time. For example, if the user 102 composes an e-mail message, the software agent may detect matching terms in text that the user types, in some instances while the user is still typing, and annotate matching terms in this content.

The system may provide very low latency for users to receive information regarding key terms in a user interface. Because the software agent 112 may identify terms and obtain terms automatically and in the background, in many instances the information needed for an information card 160 may be already present at the client device 110 before the term is annotated. Consequently, when the user interacts with an annotated term, the corresponding information card 160 can be displayed very quickly, often within a second or less. This provides users a very fast response while also allowing access to the information from the private database 122 without having to leave the user interface of the application 114.

However, as discussed above, downloading large numbers of terms 152 may create performance issues, and may cause the client device 110 to run low on, or run out of, memory. For example, if a user accesses a spreadsheet with hundreds of thousands of rows, the amount of associated terms and other data may simply exceed the size of the memory 119 and/or storage 117.

In one technique, the client device 110 may request a card definition from the server 120. The server may provide a card definition in response. The client device 110 may then request elements from the server. The elements may then be provided to the client device 110. The client device may use the elements to construct regular expressions to search the user interface for matches. However, this technique may require a large numbers of elements, such as key terms, to be downloaded in order to recognize matching text. For example, if the user interface contains data about customer names, the client device may need to download thousands of key terms of customer names in order to be able to identify matches on the screen. The number of names of customers may exceed the amount of memory available.

An alternative technique is made possible if the user interface contains well-formed identifiers. Well-formed identifiers, having a known pattern, allow the software agent 112 to identify matches on the user interface without downloading large amounts of data. The client device 110 may request a card definition from the server 120. The card definition may be received, which may include a matching pattern, which may be used to construct regular expressions for matching with terms on the user interface. Since the elements transferred may be only one pattern, or a small number of patterns, the amount of data transferred from the server may be minimal. In addition, memory may be conserved, and a much larger number of items may be conceivably matchable on the user interface. For example, hundreds of thousands of customer names may be identifiable without substantial memory usage. In addition, the number of regular expressions that might need to be created to search the user interface might be tiny, as a single regular expression might be capable of identifying thousands of matches, rather than one.

As an example, a regular expression of "EAC/d7" would match a large range of serial numbers, such as "EAC2898901." Once any matching serial number is found in the user interface, a request may be sent to the server to download associated data and construct an information card, according to the information card definition. The request may retrieve a matched row of data in the card object, which may be a "subset report." A view filter of a subset report may be used to filter out data. In the case of matching "EAC2898901," a view filter based on the qualification filter may be created, e.g., an attribute form value 'like' 'EAC2898901.'

Figure 2:
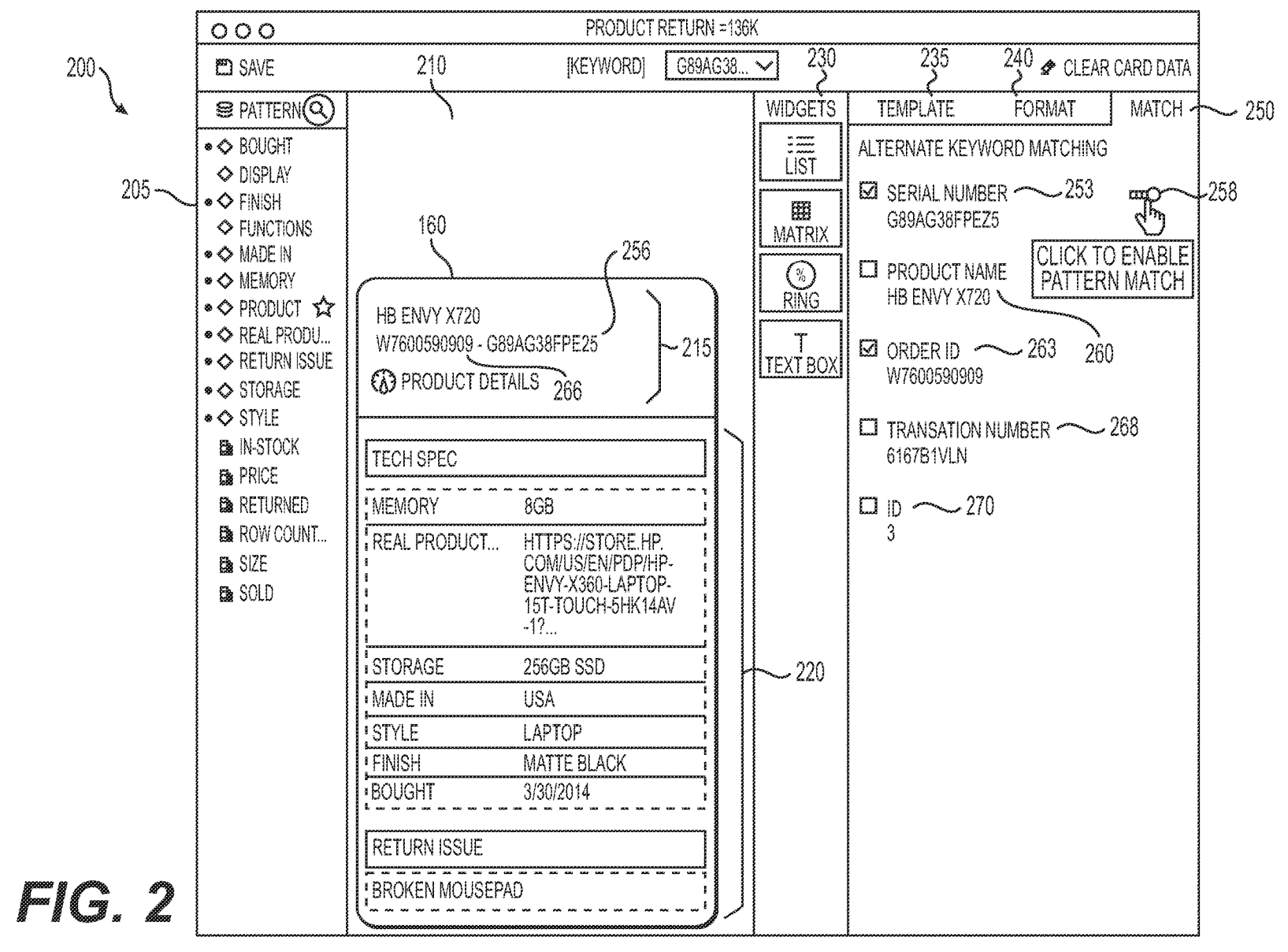

An example user interface where patterns may be defined will now be discussed. FIG. 2 depicts an example editor 200 for designing information cards. The editor 200 may be executed from a client device 110, or some other user device, and may be administered in communication with the database server 120, and/or the web server 130, etc. The editor 200 may be accessible from, or a portion of, application 114, or may be a different application entirely. Different organizations and users 102 may have different needs and use cases for information card utilization. While flexibility is desirable, creating a fully customizable design system, which may include the ability to modify source code, may be both time consuming and unintuitive, and hence expensive. Accordingly, an example editor 200 may be provided that allows for a high degree of customizability in a what you see is what you get (WYSIWYG) editor, while the default number of options provided to the user/designer may be constrained to allow for a faster and more intuitive design platform.

Users may be able to drag and drop data sources using the dataset panel 205, which may allow for the rapid addition of data-rich sources to the information card 160. The information card 160 being designed may be displayed in a design area 210. The information card 160 may have a predetermined number of sections, where each section may have predetermined data types that are permitted for display. For example, header section 215 may allow for an icon, one or more identifiers 256/266, a predetermined numerical range of lines of metadata, and/or a predetermined numerical range of links. The information card body 220 may have a different set of data types that are permitted for display, such as a certain number of widget types, which may display data including identifiers. The information card body 220 may similarly permit a number of lines or overall body size within a predetermined range. A footer section of the information card 160 may or may not be present, which may be determined according to predetermined rules, and may be of a prescribed size range.

The user may be able to drag and drop widgets from a widget panel 230, which may be of a predetermined type and number, and may be only draggable to predetermined sections, for example the information card body 220. The user may be able to select templates from a template panel 235, which may determine the overall color scheme and/or design of the information card 160. The user may also be able to control the appearance of widgets or other information card elements using the format panel 240. The contents of the format panel may be set based upon which information card element is currently selected. For example, if a list widget on the information card is selected, formatting options may be displayed in the format panel 240.

The user may also be able to define patterns in the match tab 250. Keywords may be added to the information card 160, for example from the dataset panel 205. These keywords may automatically populate in the match tab 250. One or more keyword attributes may be added to the information card 160, for example from the dataset panel 205. The match tab 250 may receive or retrieve this attribute form information, which may include the form name, form value of the first row of data, and/or form value pattern, and display them. In this way, users may be able to select any form as matching keywords. The user may be able to drag and drop keywords to the match tab, for example if those keywords are well defined. Information card 160 has example keywords serial number 253, product name 260, order ID 263, transaction number 268, and ID 270. The user may indicate that the pattern be automatically determined, for example by selecting indicator 258, though the pattern may be automatically determined by default. The automatic determining of the pattern will be discussed further below.

According to an implementation, the user may indicate that the pattern may be automatically determined by selecting an indicator or other option (e.g., checkbox, radio box, button, icon, etc.) that is provided at a higher or different stage than the example editor 200 for designing information cards shown in FIG. 2. The higher or different stage may be a settings menu (e.g., an alternative keyword matching settings menu) that allows the user to select between keyword based matching and pattern based matching. The user may further be able to select the form of matching. For a name based matching, the user may be able to select, for example, one or more forms such as Worker Preferred Name, Employee Tittle Current Description, Employee First Comma, Employee Last Comma, Worker Preferred Frist Last Comma, Worker Preferred Last First Comma, or the like.

Figure 3:
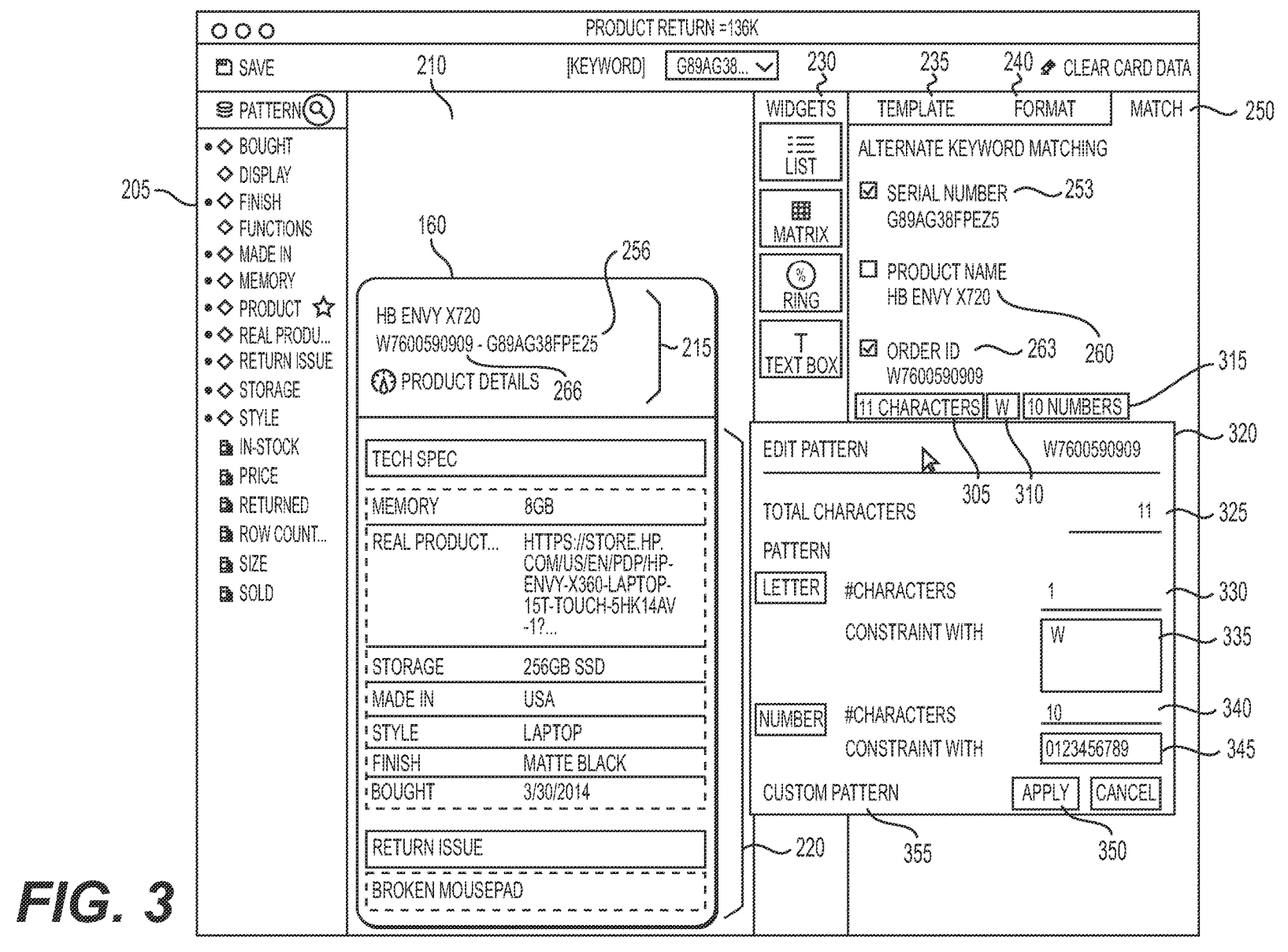

FIG. 3 depicts an example of pattern designation and editing in the editor 200. Once keyword is checked as active, for example with Order ID 263, the pattern may automatically be determined. The editor 200 may analyze one or more instances of the keyword to attempt to determine the pattern. For example, if a first instance of the Order ID is W7600590909 and a second instance is W1234567890, the editor may determine that the Order ID pattern has 11 characters (at 305), beginning with the letter W (at 310), followed by 10 numbers (at 315). The editor 200 may analyze a predetermined number of rows from the data source, for example fifty. This may yield a pattern that is close, but not perfect. The user may be able to edit the pattern in the Edit Pattern window 320, where, for example, the total number of characters may be set at 325, which may be a range. Further, the number of characters may be manually set at 330, and the characters that may be present, or a range or characters, may be set at 335. A number of characters or range may be set at 340 and the possible numerical values may be set at 345. When the user is finished editing the pattern, he or she may accept it at 350. While numerical or character limits may be set, no-limits may also be designated. Additionally, static characters or numbers may be selected. If the user wishes to fully customize a pattern, he or she may select to do so at 355.

Figure 4:
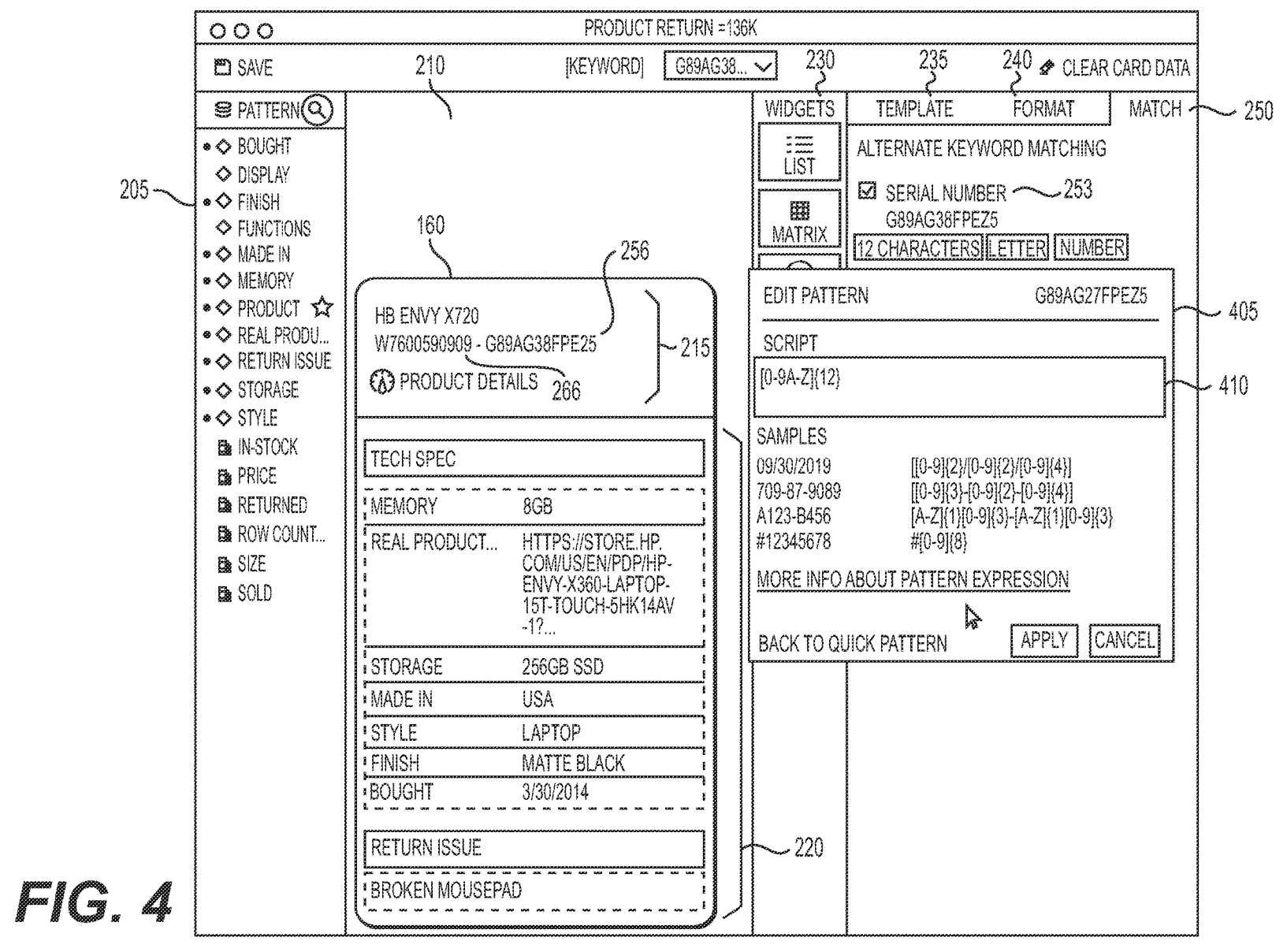

FIG. 4 depicts a custom pattern editor 405 within editor 200, which may be accessed, for example, after selecting to edit a custom pattern at 355. The script may be edited manually at 410, where ranges of alphanumeric character values, and/or static characters, may be entered. Validation and/or security checks may be implemented to ensure inputted strings do not break extensions or other clients.

Alternatively, a user interface tool may be provided to assist a user in designing a script, which may help ensure that any scripts are syntactically valid. With this user interface tool, it is easier for users, especially non-technical users, to design patterns. For each section, users may be able to select a character type (e.g., alphanumeric, number, symbols, or mixed type), a character set to indicate allowable characters, and/or a character count range to indicate how many character are allowed inside the section.

When a user interface is loaded, the pattern may result in many matches on the screen. It is possible that a matched keyword/term from the user interface might have no corresponding data in the server 120 from which information cards may be assembled. In this case, any indicator on the user interface of the keyword may be removed, and a message may be displayed to the user indicating as much, or reporting the issue to the user. Alternatively, if a matched keyword/term from the user interface has no corresponding data, then no interface tool may be provided, no portion of the interface (e.g., no word) may be highlighted (e.g., underlined) and no message may be provided indicating the same. Accordingly, when there is no corresponding data in the server 120 from which information cards may be assembled, no subsequent action may be taken based on the matched keyword/term from the user interface.

Figure 5A:
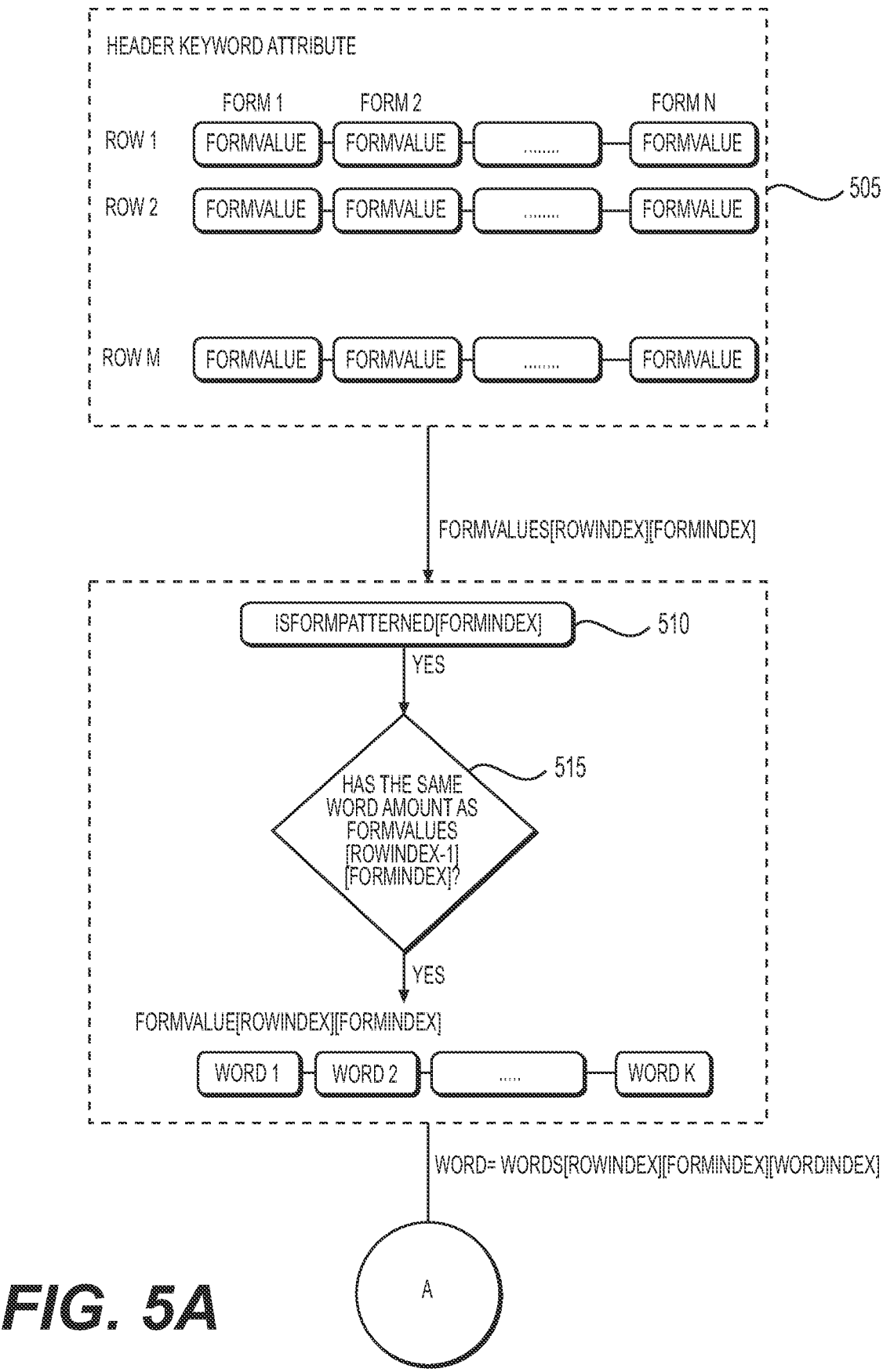
FIG. 5a-5b depict a flow chart for determining a pattern, according to techniques discussed herein.
Figure 5B:
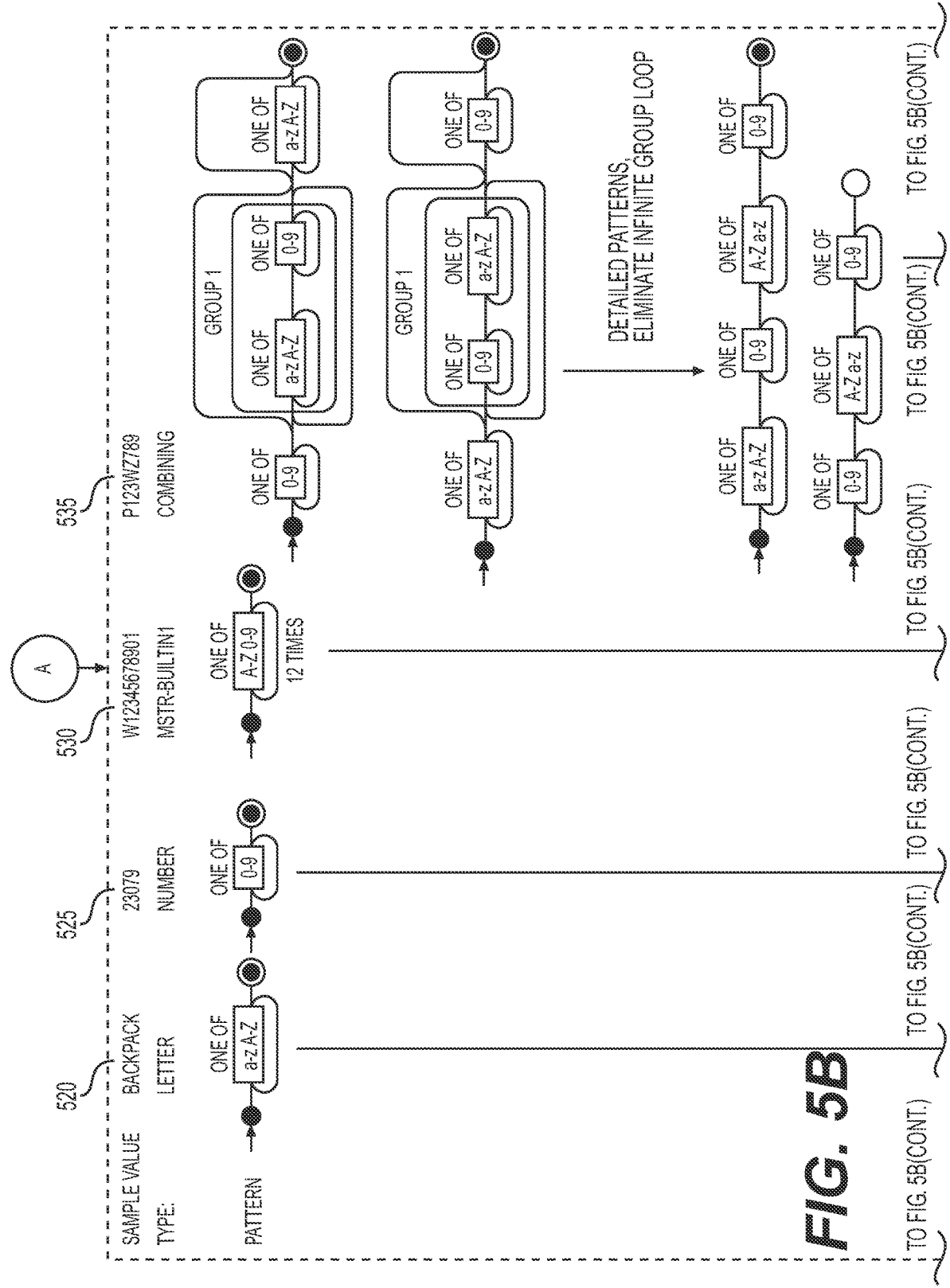
Figure 5B:
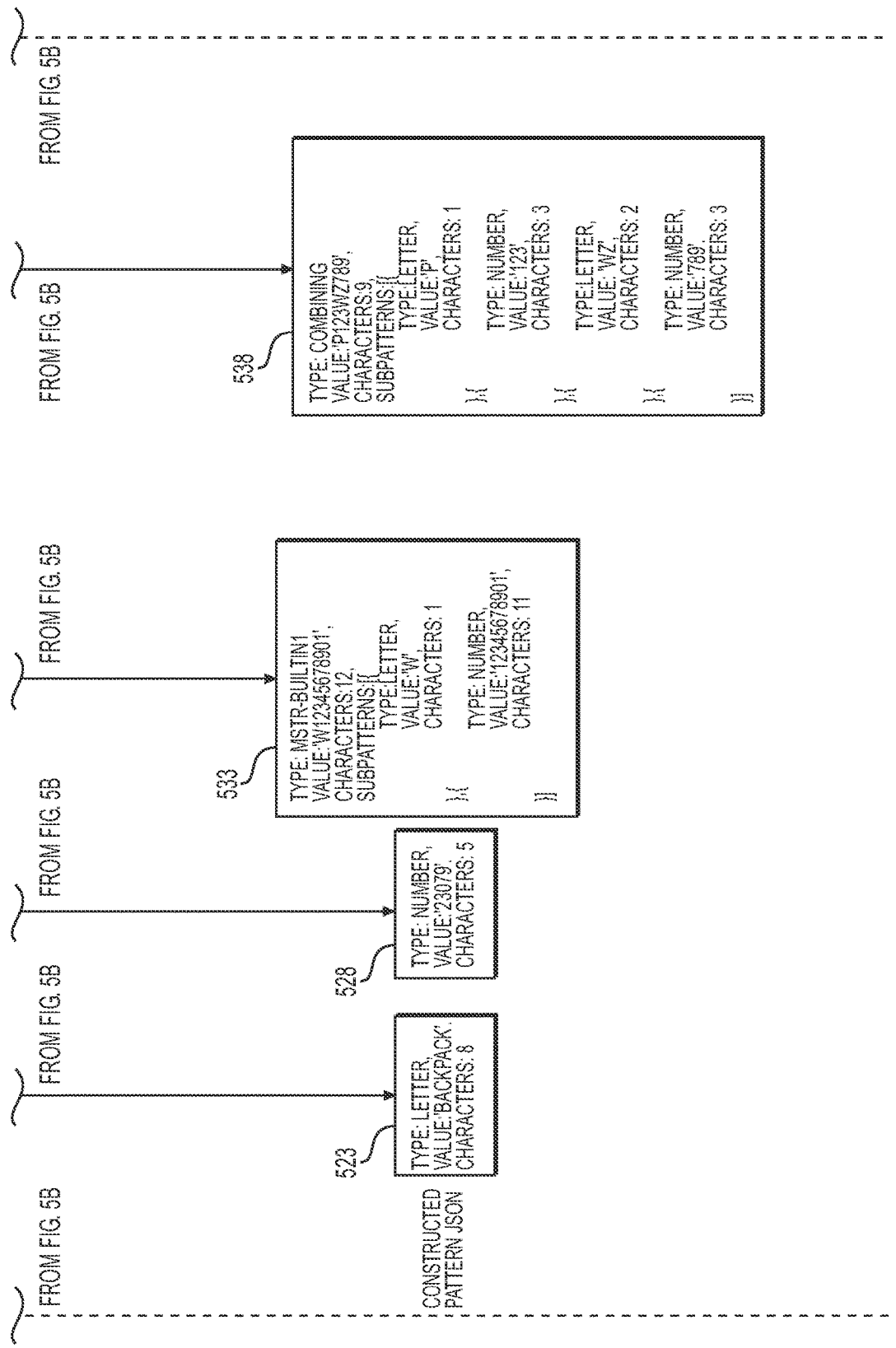

As discussed above, the editor may automatically attempt to analyze multiple rows of data examples and automatically determine a pattern. Users of the editor 200 may then be able to edit the pattern as needed. FIGS. 5a-5b detail an example process of automatically determining the pattern. In the first stage, rows of form values from a table 505 may be evaluated. At step 510, it may be determined if the form is patterned. The first fifty rows, or some other predetermined number, same column, of table 505 may be evaluated for similarities.

A word may be auto recognized with a pattern, which may consist of a sequential collection of subsections. For each subsection, it may be/[a-zA-Z]+/(type=LETTER, only having alphabet characters), /[0-9]+/(type=NUMBER, only having numeric characters), /[#_]+/(type=SYMBOL, only having special character like #,_, whitespace, etc.), and/or/ [A-Z0-9]{12}/(type=MIXED, could have any of these above characters).

For example, for word value 'EAC862345', the auto-recognized pattern would include two subsections, /[A-Z] {3}/(type=LETTER/[0-9]{6}/(type=NUMBER); And the final pattern would be/[A-Z]{3}[0-9]{6}/.

The pattern may be automatically analyzed. It may be determined, at 515, if all rows of form values (in a given column of a table) have the same amount of words. Starting with the first row, patterns may be detected from built-in pattern presets that the form value has matched, and these patterns may be recorded. If the characters are letters ("type=LETTER"), the form text values may be recorded and compared to determine whether it is static text. If the type is a combination of multiple blocks of letters and numbers ("type=COMBINING"), a specific pattern may be determined, such as [0-9]+ ([A-Za-z]+ [0-9]+)([A-Za-z]+ [0-9]+). The form value may then be matched, from a second row, with the first rows' matching patterns to filter any valid patterns. It may be determined whether there are static-text letters, or whether there is a static length. The pattern may be automatically analyzed. It may be determined, for example, when opening the match tab 250. For example, an attribute keyword with 400 elements, where inside each element there are three forms, may be provided. First the pattern for each form individually is calculated, e.g., for form transaction number 268. For the first round, each letter inside form value is taken as a subsection to get the subsection pattern. If the ith character of these 400 rows are all alphabetical, this subsection pattern would be [a-z]{1} type=LETTER. If the ith character of these 400 rows were all numeric, this subsection pattern would be [0-9]{1} type=NUMBER. If the ith character of these 400 rows are all '#-', this subsection pattern would be [#_\-]{1} type=SYMBOL.

The lengths of number and/or letter sequences may also be determined. It may be determined if there is a special character in the same place, or if there is a string of letters of the same length at the same location, etc. This process may then be repeated for all or a predetermined number of rows to determine any remaining patterns. Static-text values, static-lengths, etc., may be flagged. If no patterns are discovered, the user of the editor 200 may be notified. If patterns are determined, priorities of patterns may be determined. The COMBINING type may assigned if there are more than merely a single block of letter(s) and a single block of number(s). The fields may be restricted to only one pattern type.

In the examples in the flowchart of FIG. 5b, several examples are listed. In example 520, form value "BackPack" may be determined to be of type "LETTER." The pattern may be any capital or lowercase letters. The number of characters may be determined to be a static value of 8. These determinations may be encoded as a pattern to be provided to a client at 523. Examples herein use the JSON data format, but other programming languages may be utilized.

For example 525, form value "23079" may be determined to be of type "NUMBER." The pattern may be any number. These determinations may be encoded as a pattern, for example in code 528.

In example 530, form value "W12345678901" may be determined to be of type "MSTR-BUILTIN1." The pattern may be determined to be 12-digit sequence of letters or numbers. The leading character may be determined to be a static "W," which may be encoded in source code 533.

In example 535, form value "P123WZ789" may be determined to be of type "COMBINING." The sub patterns of the form value may be described in source code 538.

Figure 6:
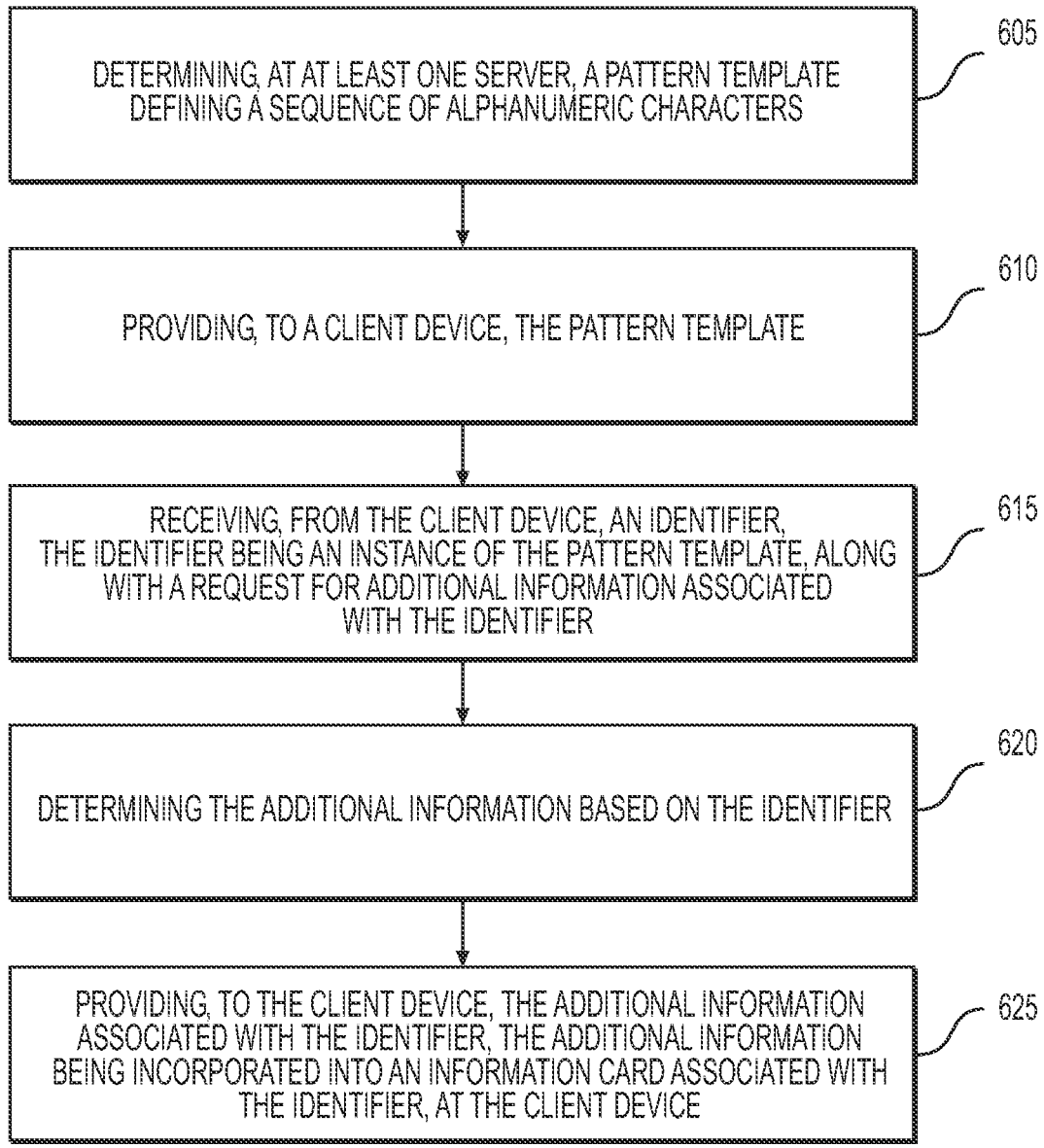
FIG. 6 is a flow chart of an example method of displaying contextually relevant information, according to techniques presented herein.

FIG. 6 is a flow chart of an example method of displaying contextually relevant information according to techniques presented herein. At step 605, at least one server may determine a pattern template defining a sequence of alphanumeric characters. At 610, the pattern template may be provided to a client device. At 615, an identifier may be received from the client device, the identifier being an instance of the pattern template, along with a request for additional information associated with the identifier. At 620, the additional information may be determined based on the identifier. At 625, the additional information associated with the identifier may be provided to the client, the additional information being incorporated into an information card associated with the identifier, at the client device.

Figure 7:
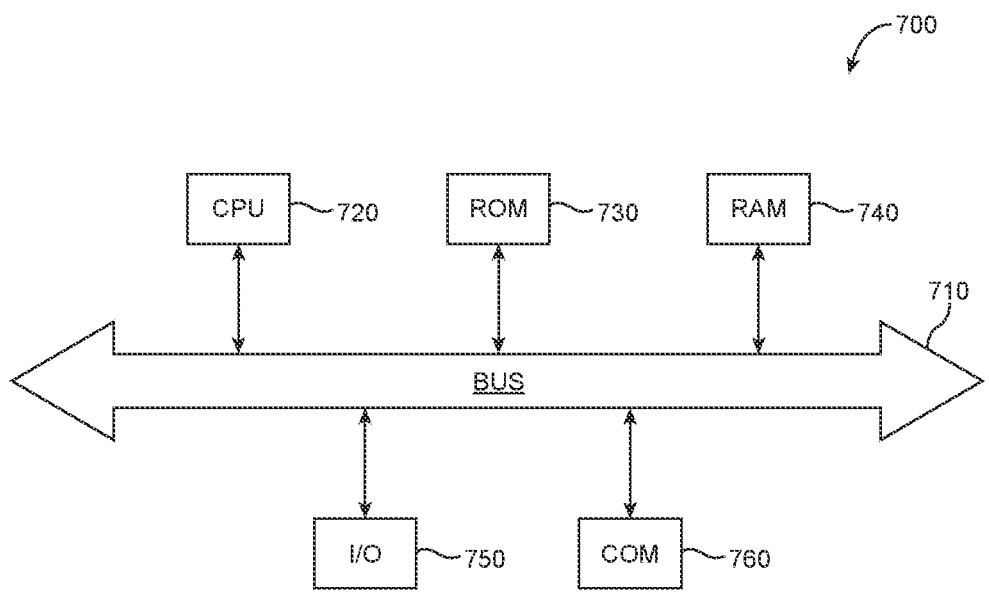
FIG. 7 depicts an example system that may execute techniques presented herein.

FIG. 7 depicts an example system that may execute techniques presented herein. FIG. 7 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform may also include a central processing unit ("CPU") 720, in the form of one or more processors, for executing program instructions. The platform may include an internal communication bus 710, and the platform may also include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for generating contextually relevant electronic information cards, comprising:
    storing, by at least one server, a plurality of sample identifiers for analysis;
    storing, by an algorithm running on the at least one server, a pattern template based on the plurality of sample identifiers, wherein the pattern template include a sequence of alphanumeric characters;
    designating, by the algorithm running on the at least one server, the pattern template as at least a first character type, a first character length, a second character type, and a second character length;
    storing, by an algorithm running on the at least one server, the designated pattern template;
    providing, to a client device, the stored designated pattern template;
    receiving, from the client device, an identifier automatically detected in a user interface display of the client device based on the designated pattern template, the identifier being an instance of the designated pattern template, along with a request for additional information associated with the identifier;
    predictively selecting, using a machine learning process, the additional information based on the identifier automatically detected in the user interface display of the client device based on the designated pattern template;
    predictively determining, using the machine learning process, a particular time to display the selected additional information based on the identifier automatically detected in the user interface display of the client device;
    predictively determining, using the machine learning process, a format to organize the additional information;
    generating an information card associated with the identifier, the information card incorporating the additional information based on determining the format to organize the additional information; and
    causing the client device to generate a graphical user interface (GUI) displaying the information card comprising the additional information at the particular time.

2. The method of claim 1, further comprising:
    receiving, from the client device, a modification of the designated pattern template.

3. The method of claim 1, further comprising determining the pattern template by:
    receiving the plurality of sample identifiers for analysis;
    determining a first portion of the pattern template by:
        determining a first character type and a first character length, the first character type being common to a first portion of all of the plurality of sample identifiers, the first character length being common to the first portion of all of the plurality of sample identifiers; and
    determining a second portion of the pattern template by:
        determining a second character type and a second character length, the second character type being common to a second portion of all of the plurality of sample identifiers, the second character length being common to the second portion of all of the plurality of sample identifiers, the first character type being different from the second character type.

4. The method of claim 1, wherein the pattern template defines an ordering of letters, numbers, and/or special characters of that comprises any matching identifier.

5. The method of claim 1, wherein the client device does not request additional data from the server until a match of the designated pattern template is found.

6. The method of claim 1, wherein determining the additional information based on the identifier further comprises:
in response to failing to find a match to the identifier, providing a message to the client device that no match has been found.

7. The method of claim 1, wherein storing the pattern template is further based on:
receiving a user designation of the pattern template.

8. The method of claim 1, further comprising:
receiving plurality of identifiers, the plurality of identifiers associated with a display on a graphical user interface; and
providing, to the client device, a plurality of pieces of additional information, each piece of additional information being associated with one of the plurality of identifiers, each of the pieces of additional information being incorporated into an information card displayable on the client device.

9. A system for generating contextually relevant electronic information cards comprising:
one or more processors; and
one or more machine-readable media storing software including instructions that, when executed by the one or more processors, cause the system to perform operations comprising:
storing, a plurality of sample identifiers for analysis;
storing, by an algorithm, a pattern template based on the plurality of sample identifiers, wherein the pattern template includes a sequence of alphanumeric characters;
designating, by the algorithm running on the at least one server, the pattern template as at least a first character type, a first character length, a second character type, and a second character length;
storing, by an algorithm running on the at least one server, the designated pattern template;
providing, to a client device, the stored designated pattern template;
receiving, from the client device, an identifier automatically detected in a user interface display of the client device based on the designated pattern template, the identifier being an instance of the designated pattern template, along with a request for additional information associated with the identifier;
predictively selecting, using a machine learning process, the additional information based on the identifier automatically detected in the user interface display of the client device;
predictively determining, using the machine learning process, a particular time to display the selected additional information based on the identifier automatically detected in the user interface display of the client device;
predictively determining, using the machine learning process, a format to organize the additional information;
generating an information card associated with the identifier, the information card incorporating the additional information based on determining the format to organize the additional information; and
causing the client device to generate a graphical user interface (GUI) displaying the information card comprising the additional information at the particular time.

10. The system of claim 9, the operations further comprising:
receiving, from the client device, a modification of the designated pattern template.

11. The system of claim 9, further comprising determining the pattern template by:
receiving the plurality of sample identifiers for analysis;
determining a first portion of the pattern template by:
determining a first character type and a first character length, the first character type being common to a first portion of all of the plurality of sample identifiers, the first character length being common to the first portion of all of the plurality of sample identifiers; and
determining a second portion of the pattern template by:
determining a second character type and a second character length, the second character type being common to a second portion of all of the plurality of sample identifiers, the second character length being common to the second portion of all of the plurality of sample identifiers, the first character type being different from the second character type.

12. The system of claim 9, wherein the pattern template defines an ordering of letters, numbers, and/or special characters of that comprises any matching identifier.

13. The system of claim 9, wherein the client device does not request additional data from the system until a match of the designated pattern template is found.

14. The system of claim 9, wherein determining the additional information based on the identifier further comprises:
in response to failing to find a match to the identifier, providing a message to the client device that no match has been found.

15. The system of claim 9, wherein storing the pattern template is further based on:
receiving a user designation of the pattern template.

16. The system of claim 9, the operations further comprising:
receiving plurality of identifiers, the plurality of identifiers associated with a display on a graphical user interface; and
providing, to the client device, a plurality of pieces of additional information, each piece of additional information being associated with one of the plurality of identifiers, each of the pieces of additional information being incorporated into an information card displayable on the client device.

17. One or more non-transitory computer-readable media storing instructions that, when executed by one or more processors, cause a performance of operations for generating contextually relevant electronic information cards, the operations comprising:
storing, by at least one server, a plurality of sample identifiers for analysis;
storing, by an algorithm running on the at least one server, a pattern template based on the plurality of sample identifiers, wherein the pattern template includes a sequence of alphanumeric characters;
designating, by the algorithm running on the at least one server, the pattern template as at least a first character type, a first character length, a second character type, and a second character length;

storing, by an algorithm running on the at least one server, the designated pattern template;

providing, to a client device, the stored designated pattern template;

receiving, from the client device, an identifier automatically detected in a user interface display of the client device based on the designated pattern template, the identifier being an instance of the designated pattern template, along with a request for additional information associated with the identifier;

predictively selecting, using a machine learning process, the additional information based on the identifier automatically detected in the user interface display of the client device;

predictively determining, using the machine learning process, a particular time to display the selected additional information based on the identifier automatically detected in the user interface display of the client device;

predictively determining, using the machine learning process, a format to organize the additional information;

generating an information card associated with the identifier, the information card incorporating the additional information based on determining the format to organize the additional information; and causing the client device to generate a graphical user interface (GUI) displaying the information card comprising the additional information at the particular time.

18. The one or more non-transitory computer-readable media of claim 17, further comprising determining the pattern template by:

receiving the plurality of sample identifiers for analysis;
determining a first portion of the pattern template by:
determining a first character type and a first character length, the first character type being common to a first portion of all of the plurality of sample identifiers, the first character length being common to the first portion of all of the plurality of sample identifiers; and
determining a second portion of the pattern template by:
determining a second character type and a second character length, the second character type being common to a second portion of all of the plurality of sample identifiers, the second character length being common to the second portion of all of the plurality of sample identifiers, the first character type being different from the second character type.

19. The one or more non-transitory computer-readable media of claim 17, wherein the client device does not request additional data from the server until a match of the designated pattern template is found, and wherein determining the additional information based on the identifier further comprises:
in response to failing to find a match to the identifier, providing a message to the client device that no match has been found.

20. The one or more non-transitory computer-readable media of claim 17, the operations further comprising:

receiving plurality of identifiers, the plurality of identifiers associated with a display on a graphical user interface; and providing, to the client device, a plurality of pieces of additional information, each piece of additional information being associated with one of the plurality of identifiers, each of the pieces of additional information being incorporated into an information card displayable on the client device.

* * * * *